US 9,801,059 B2

(12) United States Patent
Ziv et al.

(10) Patent No.: US 9,801,059 B2
(45) Date of Patent: Oct. 24, 2017

(54) SECURITY FOR WIRELESS BROADCASTS

(71) Applicant: Google Inc., Mountain View, CA (US)

(72) Inventors: Alon Ziv, Netanya (IL); Marcel M. M. Yung, New York, NY (US); Avinatan Hassidim, Petah (IL)

(73) Assignee: Google Inc., Mountain View, CA (US)

( * ) Notice: Subject to any disclaimer, the term of this patent is extended or adjusted under 35 U.S.C. 154(b) by 104 days.

(21) Appl. No.: 14/795,772

(22) Filed: Jul. 9, 2015

(65) Prior Publication Data

US 2017/0013450 A1    Jan. 12, 2017

(51) Int. Cl.
*G04F 7/04*        (2006.01)
*H04L 29/06*       (2006.01)
*H04W 12/06*       (2009.01)
*H04W 12/02*       (2009.01)

(52) U.S. Cl.
CPC .......... *H04W 12/06* (2013.01); *H04W 12/02* (2013.01)

(58) Field of Classification Search
CPC ... H04L 63/083; H04L 63/08; H04L 63/0876; H04W 12/06; G06F 21/31
USPC .............................................. 726/6
See application file for complete search history.

(56) References Cited

U.S. PATENT DOCUMENTS

2013/0125219 A1*  5/2013  Raleigh ............ G06Q 10/06375
                                                    726/5
2015/0215786 A1*  7/2015  Raleigh ............ G06Q 10/06375
                                                    455/411

* cited by examiner

*Primary Examiner* — Kambiz Zand
*Assistant Examiner* — Stephen Sanders
(74) *Attorney, Agent, or Firm* — Colby Nipper

(57) ABSTRACT

Methods and systems are provided for concealing identifying data that may be used to identify a beacon or device in broadcasts unless an observer device is able to directly or indirectly, via an authorized resolver device, translate an encrypted broadcast into the identifiable information. The wireless security scheme disclosed herein also pertains to resolving the concealed data messages to obtain the identifiable information.

20 Claims, 8 Drawing Sheets

SECURITY FOR WIRELESS BROADCASTS

BACKGROUND OF THE DISCLOSURE

This document presents protocol level mechanisms for privacy and security in Bluetooth Smart (BLE) or other relatively low bandwidth broadcast-only devices or other wireless devices and networking technologies of similar nature.

Most networking technologies support the concept of a "MAC address", which is the address assigned to a device at the lowest layer of logical processing. These addresses serve as device unique identifiers for the networking layer. When privacy is needed, some systems provide mechanisms for randomizing the devices' MAC addresses periodically. However, in these cases, when these mechanisms are used, the device cannot be uniquely identified at the network layer. The goal of the MAC address as an identifier is effectively lost.

Bluetooth Smart (formerly known as Bluetooth Low Energy, or BLE) is gaining adoption as a wireless communication protocol for peripheral devices. In particular, its broadcast only mode (where the device only sends "advertisement" packets) enables many interesting applications, as this mode's extremely low processing and power requirements enable small devices with very long lifetimes. Industry standard BLE profiles, such as Apple's iBeacon, Radius Networks' AltBeacon, and version 1 of Google's ZipBeacon, make little effort to safeguard users' privacy or provide solution security that may be advantageous in proximity beacons, object tracking tags, and device unlocking tokens.

The Bluetooth Specification itself contains some security mechanisms, but these are mostly aimed at protecting the data flow after devices are paired. When a device is operating in the broadcaster mode, the only security mechanism provided by the standard specification is use of random MAC addresses. In many cases, broadcast only applications will require additional application level security. The standard random address mechanism also does not protect against replay, which may be desirable for most security sensitive applications.

Furthermore, some networking technologies (including BLE) provide mechanisms for periodic MAC address rotation. The difference between address rotation and randomization is whether some other devices can reconstruct the true identity from the scrambled address, using some pre-shared knowledge. In the case of Bluetooth Smart, the data required for decoding the rotating MAC addresses is shared as part of the pairing process. Thus, such MAC rotation may not be used if the devices do not pair via BLE. Furthermore, the BLE MAC address rotation scheme is susceptible to replay attacks, so is not safe for use as the sole means of device identification.

BRIEF SUMMARY OF THE DISCLOSURE

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure provide methods and systems for hiding consistent identifiers and/or data that may be used to identify a beacon or device in broadcasts unless the observer device is able to directly or indirectly, via an authorized resolver device, translate an encrypted broadcast into the stable identifiers. For example, the broadcasts may have ephemeral identifiers that are translated into MAC addresses, application-level identifiers, and/or device-specific broadcast mutable state information that are hidden from devices that are not authorized devices.

BRIEF DESCRIPTION OF THE DRAWINGS

Various aspects of this disclosure may be better understood upon reading the following detailed description and upon reference to the drawings in which.

DETAILED DESCRIPTION OF THE DISCLOSURE

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Wireless devices may broadcast information that is directly identifiable (e.g., unencrypted data) or indirectly identifiable (e.g., repeated broadcasts specific to a device or type of devices) as belonging to a particular device or person (i.e., a pseudonym). Therefore, as discussed below, a wireless device may broadcast information with identifiers that are relatively temporary (e.g., ephemeral). Although the following discussion frequently refers to BLE, BLE is an example wireless technology that is discussed for simplicity, but the ephemeral identifiers discussed herein may also be applied to another wireless technology in a similar manner.

I. Security/Privacy Threats

Figure 1:
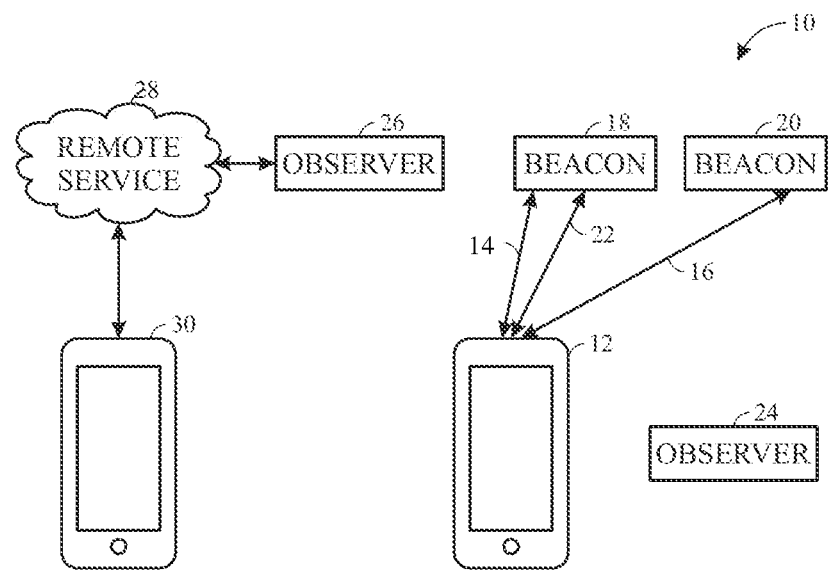
FIG. 1 illustrates a wireless connection within which one or more of the devices, methods, systems, services, and/or computer program products described herein may be used, according to an embodiment.

FIG. 1 illustrates a wireless communication scheme 10 for a wireless communication device 12. For example, the wireless communication device 12 may include a mobile wireless device or any device that is capable of wireless communication. In some embodiments, the wireless communication device 12 may be any device that is capable of communicating using BLE. The wireless communication device 12 receives broadcasts 14 and 16 from beacons 18 and 20, respectively. When the broadcasts 14 and 16 are unsecured beyond the previously discussed methods, the wireless communication device 12 may detect various information about the beacons 1 and 2. The wireless communication device 12 may determine that broadcast 14 was broadcast from beacon 18 and that broadcast 16 was broadcast from beacon 20. Furthermore, the wireless communication device 12 may determine that a second broadcast 22 was sent from beacon 18. Moreover, the wireless communication device 12 may be able to compare information between the broadcasts 14 and 22 to determine that some of the common information between the broadcasts 14 and 22 may be stable identifier information (e.g., MAC address) about the beacon 18. Furthermore, an observer 24 that has wireless capabilities may be able to associate information about the wireless communication device 12 to determine when the wireless communication device 12 has moved locations as a way to track the person carrying the wireless communication device 12.

a. Object Tracking Tags

Object tracking tags enable malicious actors to track the owner using tags from the owner's wireless device. If no protections are applied, such a tracking tag broadcasts its unique ID to the world for use by legitimate trackers. However, the same unique identifiers may also be used by malicious or unwanted trackers. This kind of privacy threat has been identified for several years, mostly as related to WiFi networks. Mobile phone operating systems via cellular networks (e.g., GSM) are slowly starting to inhibit such tracking by rotating or randomizing the MAC addresses they use for scanning.

b. Proximity Beacons

Proximity beacons may be used for location triggered actions for a mobile device, such as enabling location-limited device application program functionality. However, proximity beacons are threatened by spoofing devices that imitate a beacon of a legitimate broadcaster in order to trick customers' devices into triggering actions at incorrect places and perhaps capture information that is only to be shared with the legitimate broadcaster.

Furthermore, any unsecured beacon deployed in public may be stolen or otherwise misplaced. The proposed security measures deactivate such misplaced beacons in a way that prevents them from being used in a spoofing attack. Moreover, an unethical company may "hitch a ride" on competitor unsecured beacons to propose competing products or services when customers are near their competitors' physical locations. This action may be referred to as "showrooming."

c. Device Unlock Tokens

BLE devices may be used to unlock certain devices or functionality (e.g., door locks, controlling various electronic devices such as fire alarms and irrigation systems). If a BLE broadcaster device is used as a device unlock token, an attacker may copy and replay the device's broadcasts in order to maliciously unlock the devices or functionality unless the communications are secured.

d. Unsecured BLE Packets

In order to present a solution to the security and privacy threats on BLE broadcasters, the causes for these threats should first be examined. The following table shows an example of a Beacon advertisement packet, broken down into its component fields.

TABLE 1

Beacon advertisement packet

| Field | Description |
| --- | --- |
| d6 be 89 8e | Access address for advertising data |
| 40 24 | Advertisement PDU header<br>Type = 0 (ADV_IND)<br>TxAdd = 1 (random MAC address)<br>Length = 36 |
| 05 a2 17 6e 3d f1 | Beacon advertisement address (AdvA): 0xf13d6e17a205<br>As indicated by the TxAdd field in the header, this is a random address; the top bits are "11", making it a static random address |
| 1a ff 4c 00 02 15<br>e2 c5 6d b5 df fb<br>48 d2 b0 60 d0 f5<br>a7 10 96 e0 00 33<br>01 45 c5 | Advertisement payload |
| 52 ab 8d | Checksum cycle redundancy check (CDC) |

Table 2 is a break down of the payload field of the beacon advertisement packet.

TABLE 2

Payload field of the beacon advertisement packet of Table 1

| 02 | Length of first AD structure |
| --- | --- |
| 01 | Type of first AD structure: "Flags" |
| 1a | Flags value: 0x1A = 000011010 |
| 1a | Length of second AD structure |
| ff | Type of second AD structure: "Manufacture-Specific Data" |
| 4c 00 | Company identifier: 0x004C (e.g., Apple) |
| 02 15 | iBeacon advertisement header |
| e2 c5 6d b5 df fb<br>48 d2 b0 60 d0 f5<br>a7 10 96 e0 | Beacon type UUID |
| 00 33 | Beacon major number: 51 |
| 01 45 | Beacon minor number: 325 |
| c5 | Transmit power (in 2's complement format) |

From this example, we can see the following important elements are vulnerable: the device MAC address and the advertisement data that fully identifies the beacon (e.g., UUID, major number, and minor numbers). The device MAC address, while random in some security schemes, is static for the life of the beacon.

When considering non-beacon devices, such as unlock tokens, additional complications occur. Specifically, these devices may also transmit mutable state fields (e.g., indicating whether a wearable token has been removed from the owner's body, whether a door is locked, etc.). In the following security protocols, state fields also are protected against disclosure, tracking, and replay. Also, some broadcasts may be vulnerable to telemetry for the device due to the type of information transmitted by the broadcaster devices.

It should be clear that due to importance and vulnerability of the information; Bluetooth (or other network type) MAC addresses, application-level device identifiers, and device-specific broadcast mutable state information should all be hidden in broadcasts to prevent malicious devices from accessing such information.

As will be discussed below, some embodiments reduce or alleviate security/privacy threats. For example, when using secure wireless communication protocols discussed herein, in object tracking tags, the observer 24 may be unable to access any permanent identification information about the wireless communication device 12 with pre-shared keys used to decrypt any broadcasts from the wireless communication device 12. However, an observer 26 may access at least a portion of the permanent identification information using a connection to a remote service 28 (e.g., backend, remote resolver) even if the observer 26 only observes the wireless communication device 12 in a single sighting.

In some cases, when the observer 24 and the wireless communication device 12 share a common owner. The observer 24 may store predicted temporary identifiers for the wireless communication device 12 and any other commonly owned broadcasters. The observer 24 then is able to identify such devices even when offline from the remote service 28. Such cases may be particularly relevant for object tracking tags for devices owned by the same account and for unlock tokens to be recognized by enabled devices and/or other devices logged in to the same account.

In some relevant use cases (e.g. proximity based applications), observer 26 near a broadcaster (e.g., wireless communication device 12) may be able to detect their proximity to the broadcaster using information transmitted from the backend 28 ahead of time. This detection may be itself ephemeral (i.e., once the observer has moved away from the broadcaster, it may not be able to pretend to still be near it).

In some cases, a non-authorized tracker (i.e. observer 24) is not able to correlate that two sightings (e.g., broadcast 14 and 22) seen at different times were sent by the same broadcaster (e.g., beacon 18). The broadcaster device may transmit the same information for a limited period (for privacy vs. power/performance tradeoff) that is not be trackable over periods of a certain length (e.g., longer than 10 minutes or shorter). Thus, the non-authorized tracker cannot tell how many broadcasts a broadcaster has transmitted out of a given collection of sightings, except through incidental information (e.g. maximum number of sightings that were received within <1 second of each other).

In some cases, the encoding used for the temporary identifiers are limited by broadcast type. For example, any encoding schemes used (cryptographic or otherwise) may not expand the data beyond a 31 byte BLE advertisement payload for BLE communications.

II. Securing Communications a. Generating Ephemeral Identifiers

Systems and devices using ephemeral identifiers (eIDs) do not include stable identifying fields in their broadcasts that might be repeated. Such broadcast only schemes may include any service provisioning mode, such as BLE advertisements. Instead, these devices replace such identifiers with a different (and non-traceable) ephemeral identifier (eID). The eID can be resolved to a stable identifier by any authorized resolver using a pre-shared ephemeral ID key (EIK). In other words, the broadcasts 14 and 22 may be sufficiently different from each other that the observer 24 cannot correlate the communications to the beacon 18.

Authorized resolvers (e.g., wireless communication device 30) may be mobile devices themselves (e.g. other devices sharing the same owner as the broadcaster device) or they may use shared backend systems (e.g., remote service 28). Using backend resolution, eID values may be fully predictable. A backend (e.g., cloud) can resolve numerous (e.g., millions) identifiers per second using a pre-generated lookup table from eID to the related stable identifier. This same predictability also makes eID values safe against replay attacks.

Figure 2:
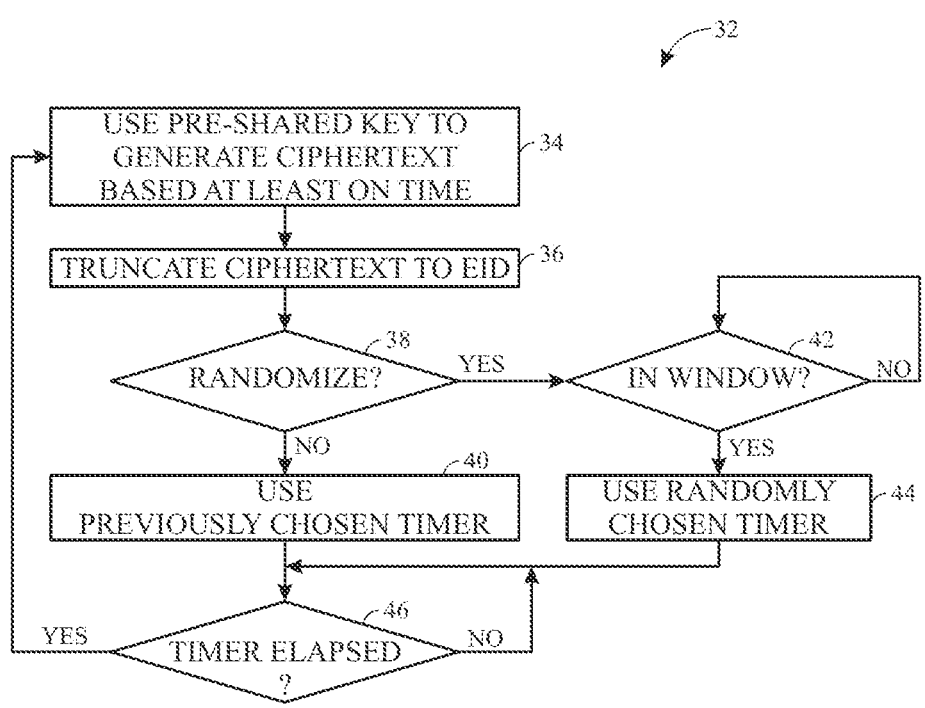
FIG. 2 illustrates a process for generating an ephemeral identifier, according to an embodiment.

FIG. 2 illustrates a process 32 for generating an eID. A broadcaster (e.g., wireless communication device 12 or beacon 18) generates ciphertext by encrypting some data that includes a timestamp using a pre-shared key, such as the EIK (block 34). For example, the ciphertext may be generated by encrypting the following data from Table 3 using the EIK:

TABLE 3

Encrypted eID information.

| Byte | Block | Mnemonic or Value | Description |
| --- | --- | --- | --- |
| 0 | Auth tag | 0x00 | A constant for authenticating |
| 1 | | 0x00 | EIK |
| 2 | | 0x00 | |
| 3 | | 0x00 | |
| 4 | Session | 0x00 | May be zero except in on- |
| 5 | counter | 0x00 | device resolved cases tokens |
| 6 | | 0x00 | |
| 7 | | 0x00 | |
| 8 | Timestamp | TS[0] | Number of seconds since |
| 9 | | TS[1] | Jan. 1, 2015 midnight UTC. |
| 10 | | TS[2] | uint32 big endian |
| 11 | | TS[3] | |
| 12-14 | Reserved | 0x00 . . . 0x00 | Reserved for Future Use. Set to 0x00. |
| 15 | Flags | 0x00 | May be zero except in on-device resolved tokens |

After encryption, the broadcaster may truncate the resulting ciphertext to an eID having a length appropriate for the security level for an underlying wireless technology or desired security strength (block 36). For example, in some embodiments, the truncated ciphertext may be 48 bits.

The broadcaster generates a new eID periodically. In other words, eID generation is an iterative operation that is repeated over time. The identifier generation period may be previously negotiated with the resolver at the time that the EIK is generated and/or shared. To hamper tracking in small populations, broadcasters may randomly select their specific rotation instant of generation within a rotation period for the broadcaster. Thus, the broadcaster determines whether the rotation instant is to be randomized, such that the rotation period may be a window in which a new eID is be generated/used (block 38). Thus, in the randomized cases, the broadcaster has flexibility and randomness to the change the eIDs. If the rotation period is not to be randomized, the broadcaster uses a previously chosen/negotiated timer (block 40). If the rotation period is to be randomized, the broadcaster determines whether the rotation window is open (block 42). If the window is closed, the broadcaster waits. If the window is open, the broadcaster uses a randomly chosen timer that fits within the window. Regardless of which timer is used, the broadcaster determines if the timer has elapsed (block 46). If the timer has not elapsed, the broadcaster waits for the timer to elapse. If the timer has elapsed, the broadcaster restarts the process 32 to generate a new eID.

Additionally or alternatively, a broadcaster will have additional keys (e.g. an Ephemeral Namespace Key, ENK) identifying it as belonging to a specific namespace. In such a case, the broadcaster will generate a second ephemeral ID (namespace eID, NeID) using the same procedure, except that ENK is used for encryption instead of EIK. The ephemeral namespace ID can be generated on the same rotation schedule as the main ephemeral ID or a different one.

b. Processing Ephemeral Identifiers

Figure 3:
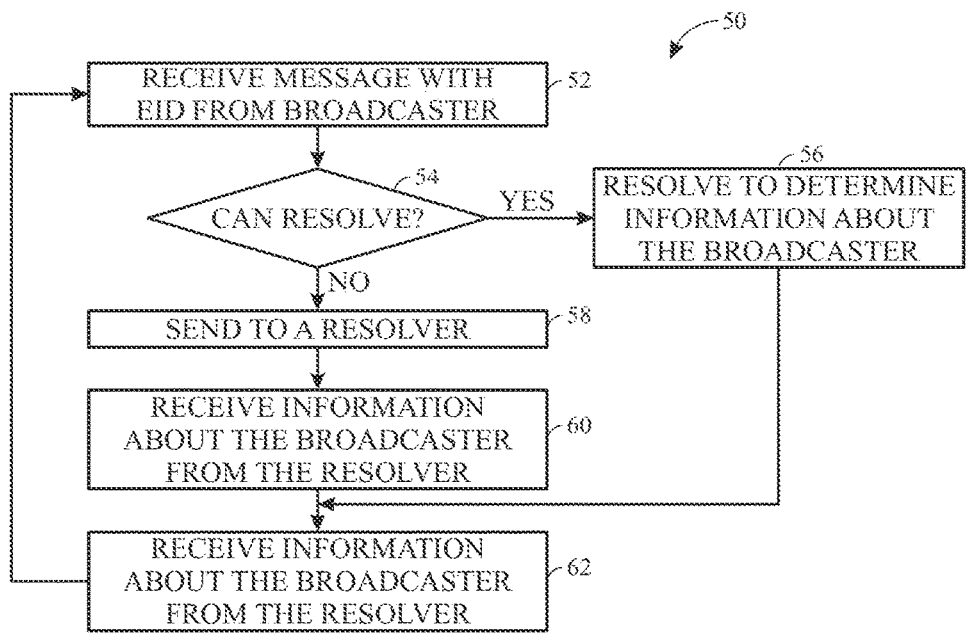
FIG. 3 illustrates a process for processing the ephemeral identifier of FIG. 2, according to an embodiment.

FIG. 3 illustrates a process 50 for resolving eIDs when received by an observer. A broadcast observer (e.g., wireless communication device 12 or observers 24 and 26) receives a broadcast message including an ephemeral ID from a broadcaster (block 52). The broadcast observer determines whether the observer can resolve the eID without further outside communications (block 54). If the observer can resolve the eID alone, the observer resolves the eID to determine information about the broadcaster (block 56). If the observer cannot resolve the eID alone, the observer sends this message to an authorized resolver for further processing (block 58). The ephemeral ID message may be accompanied by other information about the observer, such as the current location of the observer.

Figure 4:
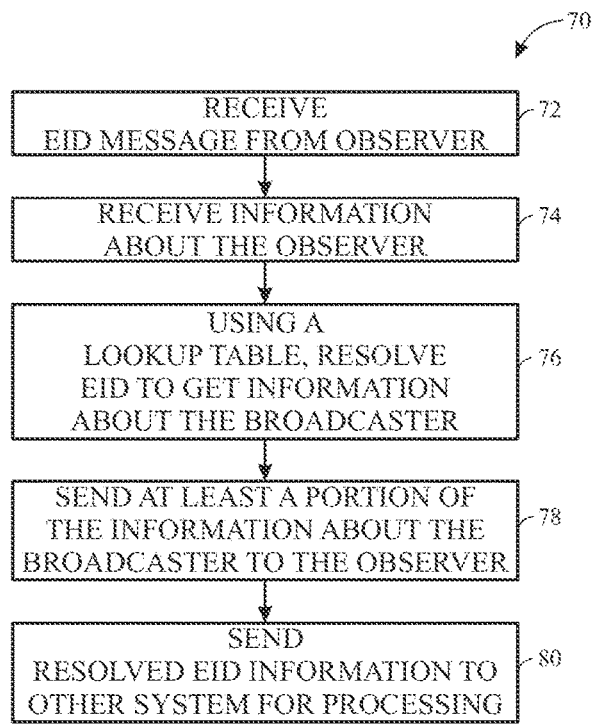
FIG. 4 illustrates a process for processing the ephemeral identifier of FIG. 2, according to an embodiment.

FIG. 4 illustrates a process 70 for an authorized resolver (e.g., remote service 28) to resolve an eID. The resolver receives an eID message from an observer that the observer had received from a broadcaster (block 72). As discussed above, the resolver may receive information about the observer along with the eID message (block 74). The resolver uses a lookup table to resolve the eID to get information about the broadcaster (block 76). The resolver then sends at least a portion of the information about the broadcaster to the observer (block 78). The resolver can apply access control rules to determine what information to provide to the broadcast observers. Broadcast observers may be granted full access to the resolved stable identifier, or broadcast observers may be permitted less detailed stable information only. For example, a broadcast observer may be sent information that includes no stable information about the broadcaster. The resolver may also send the resolved stable identifier, together with some or all of the information about the observer, to other systems (e.g., remote services) for further processing (block 80). For example, the other systems may use the received information to build a database of resolved device locations.

i. On-Device Resolution of Ephemeral Identifiers

Figure 5:
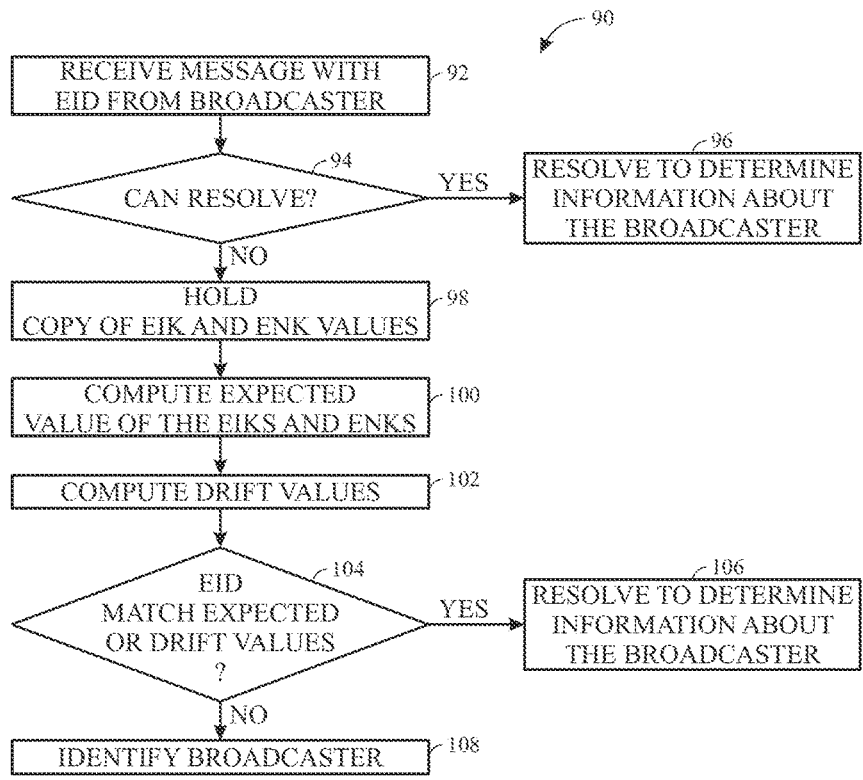
FIG. 5 illustrates a process for an observer to complete on-device resolution of the ephemeral identifier of FIG. 1, according to an embodiment.

FIG. 5 illustrates a process 90 for an observer to complete on-device resolution of eIDs. The observer receives a broadcast from a broadcaster that includes an eID (block 92). The observer determines whether the observer can resolve the eID on-device (block 94). In some embodiments, an observer device owned by the same broadcaster can act as an authorized resolver or otherwise empowered observer device, such as a master device for a namespace. Such embodiments may be particularly effective when the number of broadcaster devices is small.

If the observer is unable to resolve the eID locally, the observer sends the eID message to a remote resolver (block 96). If the observer is able to resolve the eID locally, the observer will hold a copy of the relevant broadcaster's EIK and ENK values (block 98). Then the observer computes the eID/NeID expected from each of the devices in its database at the current instant in time (block 100). The observer may also compute drift values that includes allowable drift (block 102). The observer then compares expected and/or drift values with the eID in the received message (block 104). If the eID does not match expected or drift values, the observer sends the eID message to a remote resolver (e.g., remote service 28). If the eID matches an expected value or a drift value, the resolver has identified the broadcaster (block 106). In some embodiments, if the eID matches a drift value and an expected value, the observer will prioritize the expected value over the drift value.

ii. Remote Resolution of Ephemeral Identifiers

Figure 6:
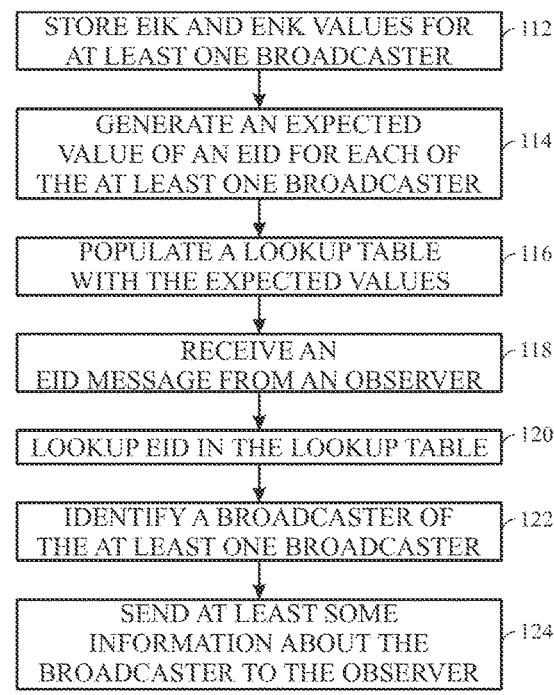
FIG. 6 illustrates a process for remotely resolving the ephemeral identifier of FIG. 1, according to an embodiment.

FIG. 6 illustrates an embodiment of a process 110 for remotely resolving an eID. Resolution by a remote resolver (e.g., cloud backend) is used when the broadcaster device is completely unknown to the direct observer, the broadcaster and resolver do not share an owner, there are too many broadcasters to resolve using on-device resolution, and/or the on-device resolution has failed. For example, remote resolution may be used when collecting crowdsourced data for object tracking since the observers have no relation to the tracked broadcasting objects, and the broadcasting objects might be moving and/or lost to their original owners. Moreover, remote resolution may also be useful for proximity beacons, which occasionally move.

In this mode of resolution, the remote resource (e.g., remote service 28) stores a copy of all EIK and ENK values for at least one associated broadcaster (block 112). Since the variable component (time) is also known by the remote resource, the remote resource is able to predict the eID values for each of the at least one broadcaster at numerous times (block 114). The remote resource is thus able to pre-populate a lookup table that maps all expected eID values (in a specific time period) to its corresponding stable ID (block 116). When the remote resource receives a report using an ephemeral ID (block 118), the remote resource uses the eID to locate the corresponding stable ID in the lookup table (block 120). The remote resource identifies the broadcaster from the at least one broadcaster based on the lookup table results (block 122). After identifying the broadcaster, the remote resource sends information about the broadcaster to the observer (block 124)

An advantage of the lookup table is that the remote resource does not need to perform any cryptographic operations at query time. In other words, all cryptographic operations, e.g., computing expected eID values, are performed offline. Thus, the amount of computation is traded against storage size. A remote resource supporting 10 million broadcasters may use a database of 160 megabytes per "tick" it can decode. If we assume, e.g. 512-second "ticks," the 160 MB database translates to 2.25 gigabytes for two hours' worth of eID values. Another 800 kilobytes would account for 60 days' worth of accumulated drift. Thus, in some embodiments such as this case, the storage may be stored completely RAM. A higher-capacity remote resource might hold the eID mapping for a larger period of time in a sharded database and sort incoming requests and use a map-reduce paradigm to resolve the mapping.

iii. Resolution of Ephemeral Identifiers by Proximate Observers

Proximity observers should efficiently identify when one of a set of "interesting" broadcasters is nearby. In certain embodiments, such detection occurs when the observer is offline. The determination that a broadcaster is "interesting" to a certain observer may be generally be carried out by a protocol between this observer and another fully-authorized resolver. For example, an observer can be a mobile device subscribed to a certain set of beacons, and the cloud backend can use this subscription to indicate that these beacons are interesting to this mobile device.

Figure 7A:
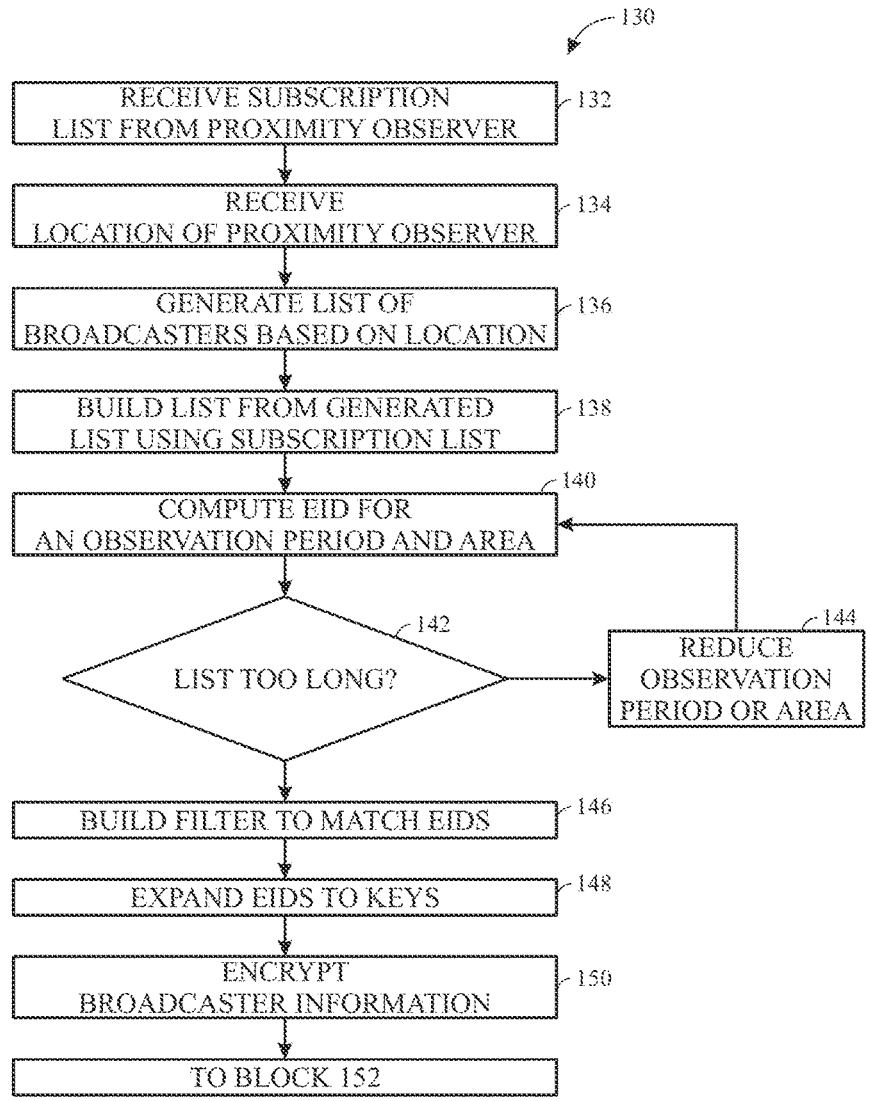
FIG. 7A illustrates a first part of a process for resolving the ephemeral identifier of FIG. 1 using proximate observers, according to an embodiment.
Figure 7B:
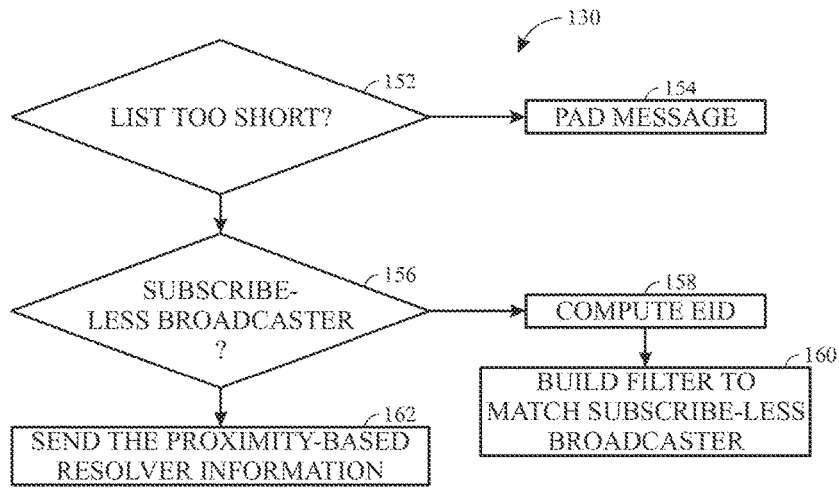
FIG. 7B illustrates a second part of the process of FIG. 7B for resolving the ephemeral identifier of FIG. 1 using proximate observers, according to an embodiment.

FIGS. 7A and 7B illustrate an embodiment of a process 130 for resolving eIDs using proximate observers. The remote resource receives a subscription list from a proximity observer (block 132). The remote resource also receives a location of the proximity observer (block 134). To support proximity-based resolution, the authorized resolver generates a list of "interesting" broadcasters the proximity observer may be expected to encounter (block 136). This set will depend on geographic location of the observer and broadcasters, as well as on the length of time for the observation and expected potential movement of the observer and broadcasters during this time.

The remote resolver then builds a list of broadcasters satisfying the observer's subscriptions in the determined observation area (block 138). The remote resolver then computes expected eIDs for each broadcaster for the observation period in the observation area. (block 140). For example, the remote resolver may compute expected eIDs for each broadcaster in a 5-mile radius in the next hour. The resolver determines if the list is too long (block 142). For example, the resolver may determine that the remote device has limited storage, limited computational abilities, and/or limited communication bandwidth as an indication that the radius and/or period should be reduced. The resolver may decide to reduce the observation area and/or the observation period in order to keep this list to a reasonable size for the proximity observer (block 144).

If the list is not too long, the remote resolver then builds an efficient filter (e.g. Bloom filter) to match the interesting eIDs (block 146). The remote resolver uses a key-derivation function (KDF) to expand each eID to a key (block 148). The remote resolver uses this key to encrypt the broadcaster's static ID and/or other information about the broadcaster (block 150).

The remote resolver then determines whether the list is too short (block 152). For example, the remote resolver may determine that the list is too short because the message is not maximum length for a communication packet based on the underlying technology (e.g., BLE). If the message is too short, the remote resolver pads the message with random blobs that look the same as encrypted ID blocks (block 154). However, these encrypted blobs are not and/or may not be decrypted by any key. Essentially, the encrypted blobs only purpose is to prevent an attacker able to track the level of traffic from using such a query to count broadcasters of a certain type in a given area.

In some embodiments, the remote resolver attempts to capture broadcasters that are not subject to any subscription. In such embodiments, the remote resolver determines whether any subscription-less broadcasters are in the observation area (block 156). If there is a subscription-less broadcaster, the remote resolver computes an expected eID in the observation period for the subscription-less broadcaster (block 158) and builds a filter that matches any of the subscription-less broadcasters (block 160).

The remote resolver supplies the proximity-based resolver with the observation area, the observation period, filters of interesting and uninteresting eIDs, and the encrypted resolution responses (block 162).

Figure 8:
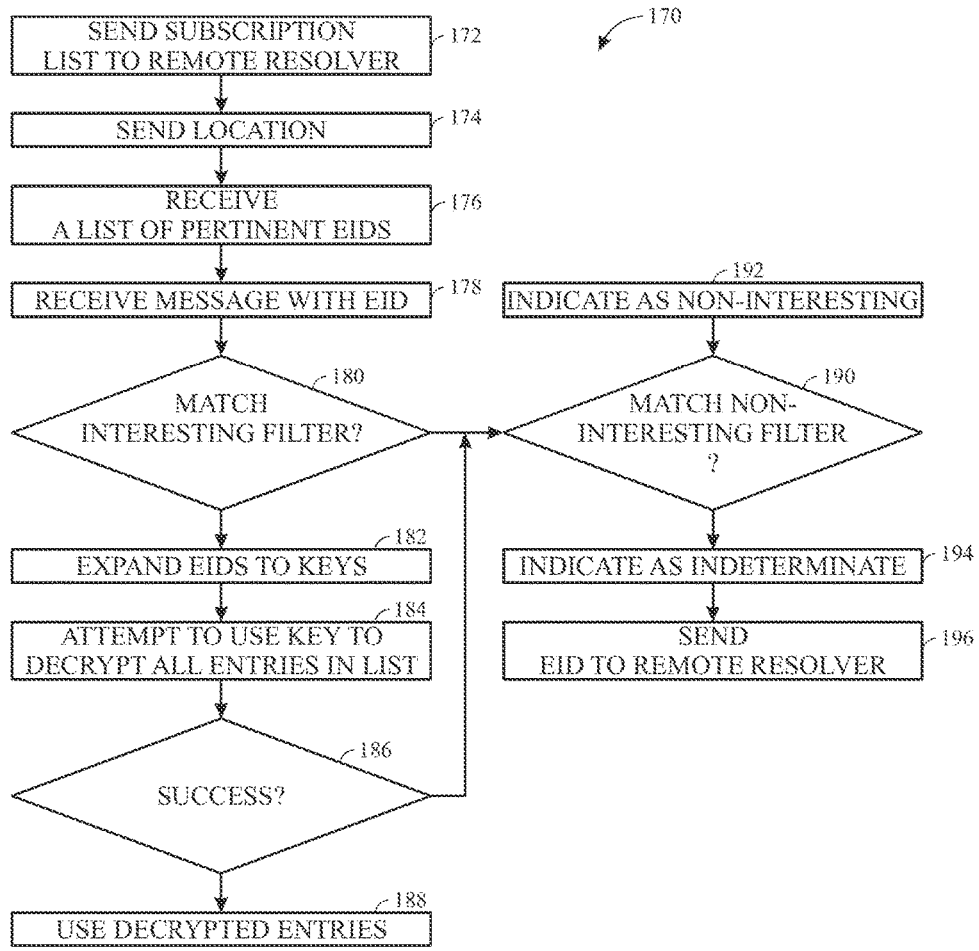
FIG. 8 illustrates a process for a proximity resolution by a proximity observer, according to an embodiment.

FIG. 8 illustrates an embodiment of a process 170 for a proximity resolution by the proximity observer. The proximity resolver sends a subscription list to the remote resolver where each subscription indicates a type of broadcasting device or broadcasts that the broadcasting device may broadcast (block 172). The proximity resolver also sends its own location to the remote resolver (block 174). The proximity resolver then receives a list of eIDs along with broadcaster information for each eID (block 176). When the proximity resolver receives a broadcast with an ephemeral ID (block 178), it determines whether the eID matches in the interesting-IDs filter (block 180). If the eID matches the interesting-IDs filter, the proximity resolver expands the received eID using the same key-derivation function used by the remote resolver (block 182). The proximity resolver attempts to use the key to decrypt all of the entries in the encrypted-IDs list (block 184). The proximity resolver determines whether the decryption was successful (block 186). If the decryption is successful, the proximity resolver then uses the decrypted entries for the resolution result (block 188).

If the decryption was unsuccessful or the eID does not match the interesting filter, test if the received ephemeral ID is covered by the "non-interesting" filter (block 190). If it is, indicate the resolution result is "uninteresting broadcaster" (block 192). If the eID does not match the uninteresting filter, indicate that an indeterminate resolution has resulted (block 194). Send the eID to a remote resolver to be resolved (block 196).

c. Cryptographic Primitives and Key Management

The following sections discuss using a simple cryptographic scheme, built mostly around use of Advanced Encryption Standard-128 (AES128) in various modes and mode combinations. AES is chosen here due to its high ubiquity in Bluetooth devices (since AES is already used in parts of the Bluetooth specification), as well as the high level of confidence in its security. For extra efficiency, in some embodiments, AES is used almost solely in one direction (encryption), either as a plain pseudorandom function (PRF) or in an authenticated encryption mode (EAX). In certain embodiments, other suitable cryptographic schemes/standards may be deployed.

A second cryptographic primitive used in this design is elliptic-curve Diffie-Hellman, using the Curve25519 scheme. This primitive is used to establish the initial shared keys between the broadcaster devices and the observers (note that during this process, the devices need to establish a connection). The full initialization protocol, as well as the rationale for using it, is described in a later section.

An alternative cryptographic scheme used for initial key establishment is based on an RSA public-key cipher. With this scheme, the design also uses a non-standard AES-based hash function (AES_Hash). In some embodiments, the scheme uses 128-bit AES or 256-bit Rijndael-256 hashing.

Although in some embodiments each data field is protected using a different scheme and a different key, in some embodiments, embodiments may include a simple implementation using the Bluetooth IRK (identity resolution key) for some/many/all schemes. This key is used to ensure that even the simplest Bluetooth devices are able to implement the described protocol.

In some use cases where many devices are to recognize the broadcasters (e.g. object tracking tags, proximity beacons), the relevant key (or keys) are shared between the broadcaster device and the backend. In other use cases (e.g. device-unlock tokens), the key may be shared only between one mobile device and the token.

d. Protocol Scheduling

The different protection schemes described in this document periodically generate new values, in order to make the observed values more "ephemeral" to block long term tracking and hindering replay attacks. The different per-field schemes are "clocked" together (i.e. all fields change their values at substantially the same moment in time), to block an attacker from correlating different values in one field using the fixed value in another and defeating overall security for the connection.

In order to enable large-scale processing of observed values (where a backend resolves observations, as in the object-tracking crowd-sourcing case), the schemes use a single time base to determine observations in relation to each other. For example, all devices may be initially synchronized to a global master clock counting seconds since midnight 2015-01-01 UTC. Each device then rolls out new values at a configured rate, between once per second and once per 512 seconds. In some embodiments, the configured rates are restricted to powers of 2. Note that in some embodiments, the higher rates are restricted to device-to-device use-cases (e.g. unlocking), as they may highly degrade performance of backend processing.

Since, in some embodiments, broadcasters' clocks are not synchronized after the initial provisioning, they are likely to accumulate some "drift" during their operational lifetime. In such embodiments, observers (and backends) accommodate such drift (e.g., up to 500 ppm of such drift). Additionally, in order to prevent attackers from recognizing a broadcaster using its specific drift as a "signature", in some embodiments, broadcasters can randomly perturb their own clocks (e.g., once every 512 seconds) by adding a randomly-selected value. In some embodiments, this randomly-selected value may be distributed normally with mean 0 and variance ¼ or some other suitable variation.

e. Hiding MAC Addresses

The Bluetooth specification provides a mechanism for devices to randomize their MAC addresses, described in volume 3, part C, section 10.8.2 of the Bluetooth 4.2 specification. The current schemes use resolvable private addresses (RPA), where the broadcaster periodically chooses a new 22 bit random nonce (termed prand) and expands it to a 48 bit address using encryption with the IRK. The resulting addresses look fully random, but may be resolved by an observer with access to the IRK.

Depending on the use case, the observer device may have direct access to the IRK; in such cases, the observer uses the MAC address in order to identify the broadcaster. Other use cases (such as proximity beacons) will not distribute the IRK to observer devices, and will not be able to directly use the randomized MAC address for broadcaster identification.

Due to the specific scheme used by the Bluetooth specification, RPA values are susceptible to replay attacks. It is therefore not recommended for any application to use RPA resolution as its sole means of identifying a broadcaster.

f. Hiding Extra Properties (Mutable State Fields, Telemetry)

Extra properties are used by some broadcaster devices to indicate data collected from the outside world by on-device sensors. In the case of telemetry, the device can choose the collection period by itself. However, other sensors may impose their own timings. An example sensor case is a bracelet that serves as an unlock token: the extra property in this case is a counter of bracelet open/close events, which needs to remain equal to the last observed value in order to perform the unlocking.

Since extra properties fields can change on their own schedule, the encryption scheme includes additional variability when encrypting them. These fields are therefore encrypted by 1) generating a 48-bit nonce that includes the common time base and 16 random bits (other suitable sizes), 2) encrypting the state signal using AES-EAX using the nonce computed in the previous step and the EIK to produce a 16 bit authentication tag, and 3) transmit the 16 random bits, the encrypted state, and the 16 bit authentication tag.

g. Initialization Protocols

The purpose of the initialization protocol is to share keys and synchronize time between a new broadcaster device and authorized "owner observers." In some embodiments, the initialization protocol may be used in some cases but not others. In certain embodiments, three initialization methods may be supported: 1) based on standard Bluetooth pairing, 2) using a private application program driven protocol that does not use RSA, and 3) using a private application driven protocol that uses RSA.

i. Generating Randomness by Broadcasters

Since broadcasters may be resource-limited devices, their available sources of randomness are also limited. When generating EIK values at a high security level, each broadcaster uses multiple sources for randomness. The broadcaster may use any of the following: the time base supplied to the broadcaster by an application program, the backend public-key value (if available), random data provided by the device manufacturer during fabrication that is stored in read-only memory (e.g., flash/ROM), any physical randomness the device is able to collect (e.g. using a hardware secure random generator or a checksum of SRAM contents immediately after power-up), and/or another suitable source of randomness.

ii. Initialization Using Bluetooth Pairing

After pairing the broadcaster device to an owner's electronic device (observer), an application program on the mobile will establish a GATT connection to the device. The GATT connection is protected by Bluetooth native security. The paired connection is used to set the time base and to read the IRK and EIK, and optionally to write the ENK using an "ephemeral initialization" service. The initialization service includes GlobalTimeBase, IRK, EIK, and ENK attributes that are accessible over an authenticated and encrypted connection. The GlobalTimeBase attribute is a readable and writeable value of a predetermined size (e.g., 32 bits). The application program uses this attribute to write the current globally-shared time base to the device, or to verify the device's current time base. The IRK attribute is readonly value of a predetermined size (e.g., 128 bit) that exposes the Bluetooth pairing IRK to the application program. The EIK attribute readonly value of a predetermined size (e.g., 128 bit). The EIK attribute exposes the broadcaster-generated Ephemeral ID Key to the application program. The ENK attribute is a writeonly value of a predetermined size (e.g., 128 bit) that is used by the application program to set the broadcaster's Ephemeral Namespace Key.

This initialization method has the advantage of simplicity, however it 1) relies on the standard Bluetooth pairing, which may use more easily guessable keys and thus be vulnerable to passive listeners during the pairing process, 2) only works with a single owner device and will not easily accommodate multiple devices, and 3) causes the user to perform multiple interactions.

iii. Private Initialization Protocol

When this method is used, the application program establishes a nonprotected GATT connection to the device and uses this connection to relay a DiffieHellman (Curve25519) key exchange to generate IRK on both the broadcaster device and the remote resolver.

Upon connecting to the device, the application program looks for the "ephemeral registration" service. This protocol includes a RemoteDhPublicKey attribute, a DeviceDhPublicKey attribute, EncEIK attribute, GlobalTimeBase attribute, and an EncENK attribute. The RemoteDhPublicKey is a writeonly value having a predetermined size (e.g., 256 bit). For example, a Curve25519 public key may be provided by the backend. In some embodiments, the backend will periodically roll its public/private key pair keeping old values active for at least one month. The application program requests a new public key from the backend if the key it has is older than a week. Once the application program writes this attribute, the device will compute the DiffieHellman shared secret using the Curve25519 scheme. It will then hash this secret twice using AESHash (AES in Davies-Meyer mode) and record the output as its IRK, and will generate EIK (either randomly or as equal to IRK). After IRK and EIK are set, the device may ignore any further writes to RemoteDhPublicKey.

The DeviceDhPublicKey attribute is a readonly value of a predetermined size (e.g., 256 bits). In some embodiments, this attribute may correspond to a Curve25519 public key. The device key pair is fixed for the life of the device, and it may be generated on the device itself (e.g. at first powerup), or the key may be preprovisioned by the manufacturer.

The EncEIK attribute is a readonly value of a predetermined size (e.g., 160 bit). The EncEIK exposes the device-generated Ephemeral ID Key to the application program. In some embodiments, the EncEIK is encrypted using AES-EAX with the once-hashed Curve25519 secret as the key and the GlobalTimeBase as the nonce.

The GlobalTimeBase attribute is a readable and writeable value of a predetermined size or sizes (e.g., 32 bits or 64 bits). The application program uses this attribute to write the current globally-shared time base to the device, or to verify the device's current time base.

In some embodiments, before the RemoteDhPublicKey is written (i.e. IRK/EIK are not set), the device accepts all writes to this attribute and immediately sets its clock using the low 32 bits of the received value. After the IRK is set, the device expects the value to include a 32 bit clock value and a 32 bit AES-EAX authentication tag computed on a null message with this value as additional data, the previous GlobalTimeBase as a nonce and EIK as the key.

The EncENK attribute is a write-only value having a predetermined size (e.g., 160 bit) that is used by the application program to set the broadcaster's Ephemeral Namespace Key. The ENK value is first encrypted using AES-EAX with the current GlobalTimeBase as the nonce and EIK as the key.

Figure 9:
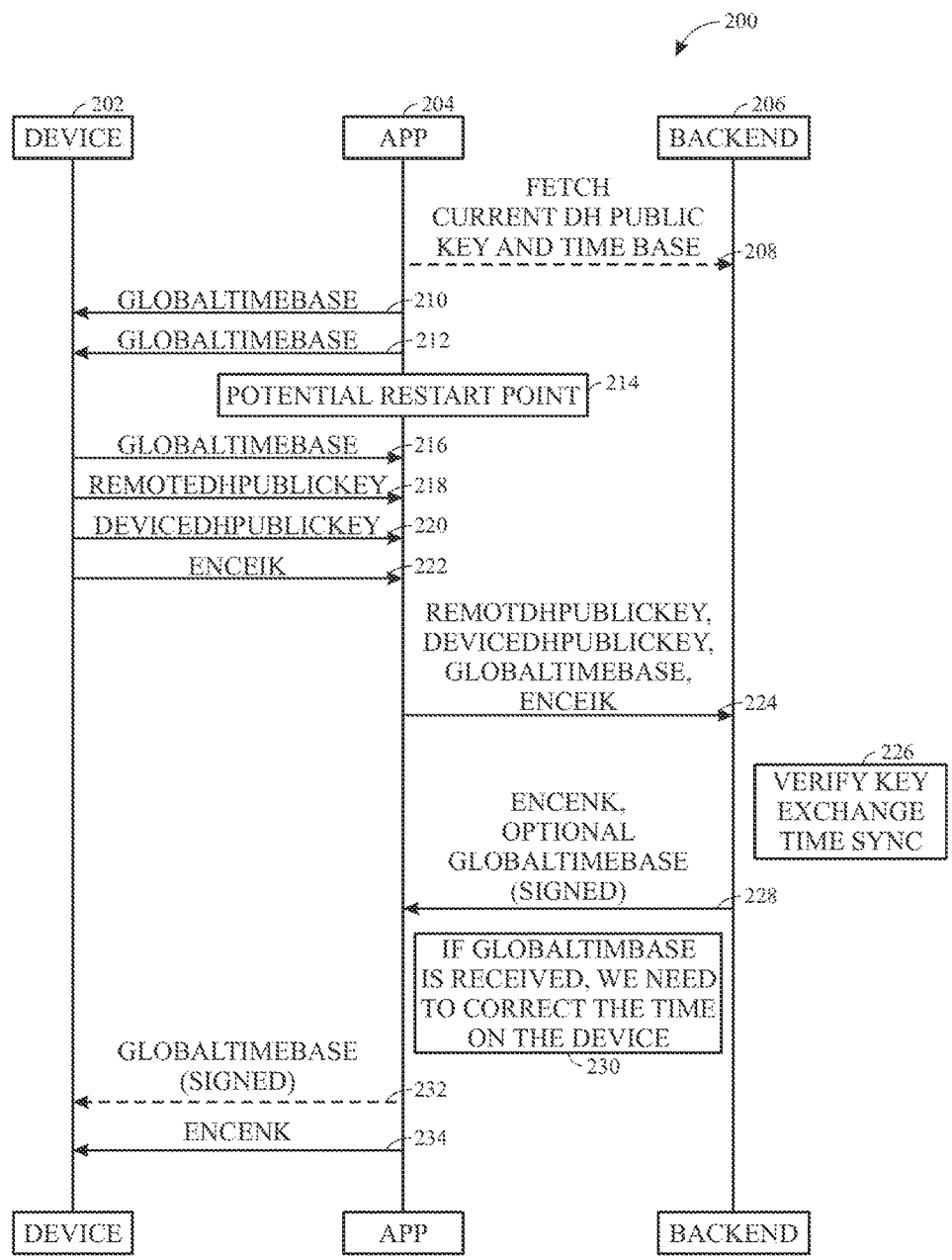
FIG. 9 illustrates a protocol interaction for a private initialization protocol, according to an embodiment.

FIG. 9 illustrates a protocol interaction 200 between a broadcasting device 202, application program 204, and the backend 206. The broadcasting device 202 may be any device that broadcasts wirelessly. The application program may be any device and related software that receives broadcasts from the broadcasting device 202 and connects to the backend 206 (e.g., remote service 28). The application program 204 fetches 208 the DhRemotePublicKey and the GlobalTimeBase from the backend 206. The application program then forwards the GlobalTimeBase 210 and the RemoteDhPublicKey 212 to the broadcasting device 202.

After this information is transmitted to the broadcaster device, this information may be omitted if the process stops or should be restarted. Instead, the process begins at the restart point 214.

The broadcaster device 202 returns the GlobalTimeBase 216 to verify the time base of the broadcaster device 202. The broadcaster device 202 also sends the RemoteDhPublicKey 218, the DeviceDhPublicKey 220, and the EncEIK 222 to the application program which, in turn, passes this information 224 to the backend. The backend 206 then verifies the key exchange and synchronizes clocks with the broadcasting device 202. The backend 206 then passes the EncENK 228 to the application program. In some cases, a signed GlobalTimeBase 230 may be included in the EncENK 228 message or in place of the EncENK 228. Presence of the GlobalTimeBase indicates a time change should occur at the broadcasting device 202. The application program 204 forwards the GlobalTimeBase 232 and/or the EncENK 234.

This protocol may complete many or all transactions with only one roundtrip between the application program and the backend, with the application program acting as relay to the broadcaster device being initialized. In some embodiments, an optional roundtrip may be used to fetch the backend public key and the current time base. In some embodiments, an additional roundtrip may be used to complete the key exchange.

The protocol may also be restarted if it was interrupted or if a device is to be reprovisioned. Performance of Curve25519 computation on the device is the main bottleneck of this protocol. This computation may take around 300 milliseconds on at least some of the current-generation ARM-based BLE chipsets. Other chipsets may perform such computations more quickly or more slowly.

This method is more complex than the pairing-based one, but it is more secure when used on electronic devices with at least some versions of Bluetooth stacks. This method also more easily enables multi-device use. The private initialization protocol may be initiated through a user operation (e.g., button press in the application program), automatically by detecting device proximity (e.g. by embedding a suitable NFC tag in the device), or automatically upon connection/continuation of a wireless connection (e.g., BLE).

i. Private Initialization Protocol—RSA-Based

When an RSA-based private initialization protocol is used, the application program establishes a non-protected GATT connection to the broadcaster, and uses this connection to relay a key exchange between the broadcaster device and the remote resolver. The key exchange uses the RSA public-key encryption scheme, which is easier on low-end devices with lower processing or memory availability.

Figure 10:
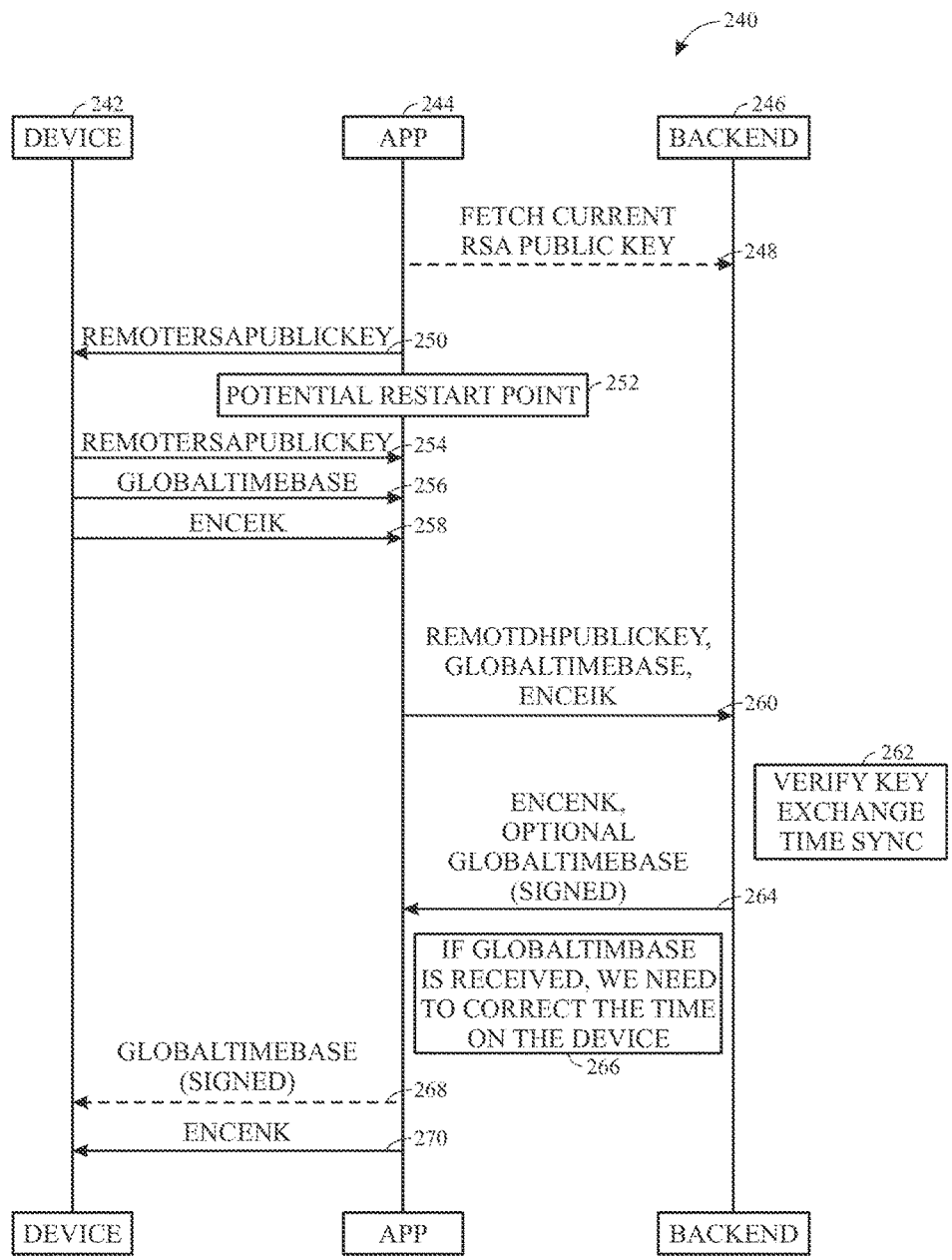
FIG. 10 illustrates a protocol interaction for a private initialization protocol using RSA, according to an embodiment.

FIG. 10 illustrates a protocol interaction 240 between a broadcasting device 242, application program 244, and the backend 246. The broadcasting device 242 may be any device that broadcasts wirelessly. The application program may be any device and related software that receives broadcasts from the broadcasting device 242 and connects to the backend 246 (e.g., remote service 28). The application program 244 will periodically connect to the backend 246 to fetch its up-to-date RSA public key 248 and its squared Montgomery reciprocal ($R^2$ mod N). The backend 246 will generate new RSA keys periodically.

Upon connecting to the broadcasting device 242, the application program 244 looks for a defined "ephemeral registration" service. The application program 242 then queries the device's level of support by reading a "RegistrationMethods" attribute that indicates whether devices support RSA-based registration. For example, the RegistrationMethods attribute may be set to 0 to indicate that the broadcasting device supports RSA-based private initialization protocols.

The application program writes the backend's RSA public key to the RemoteRsaPublicKey 250 GATT attribute on the device. In some embodiments, the RemoteRsaPublicKey 250 GATT attribute is a 4096-bit write-only attribute. After the RemoteRsaPublicKey is transmitted to the broadcaster device 242, this information may be omitted if the process stops or should be restarted. Instead, the process begins at the restart point 252.

The device 242 generates a random EIK and IRK, pads EIK using AES-based OAEP, and encrypts this message for the backend 246 using the RSA with public exponent 3 and the written RSA public key. The application program 244 receives a notification that the device has generated and encrypted its EIK, and reads it out through an EncEIK GATT attribute 258 along with the RemoteRsaPublicKey 254 and the GlobalTimeBase 256. In some embodiments, the EncEIK attribute is a read-only, 2048-bit attribute.

The application program 244 receives a GlobalTimeBase attribute 256. In some embodiments, the GlobalTimeBase attribute is a read-write, 32-bit/64-bit attribute 256. The application program 244 uses this attribute to write the current globally-shared time base to the device, or to verify the device's current time base.

Before the RemoteRsaPublicKey is written (i.e. IRK/EIK are not set), the broadcasting device 242 accepts all writes to this attribute and immediately sets its clock using the low 32 bits of the received value. After the IRK is set, the device expects the value to include a 32-bit clock value and a 32-bit AES-EAX authentication tag computed on a null message with the previous GlobalTimeBase as a nonce and EIK as the key as additional data.

After reading the EncEIK attribute 258, the application program 244 forwards the RemoteRsaPublicKey, GlobalTimeBase, and EncEIK 260 to the backend 246. The backend 246 then verifies the key exchange and synchronizes clocks with the broadcasting device 242. The backend 246 then passes the EncENK 264 to the application program 244. In some cases, a signed GlobalTimeBase 266 may be included in the EncENK 264 message or in place of the EncENK 264. Presence of the GlobalTimeBase indicates a time change should occur at the broadcasting device 242. The application program 204 forwards the GlobalTimeBase 232 and/or the EncENK 234.

As previously discussed, the EncENK attribute is a write-only, 160-bit attribute used by the application program to set the broadcaster's Ephemeral Namespace Key; the ENK value is first encrypted using AES-EAX with the current GlobalTimeBase as the nonce and EIK as the key.

In some embodiments, RSA encryption step in this scheme uses "AES-based OAEP" for padding the message before RSA encryption. This is a variant of the OAEP padding scheme where AES-CTR is used for the Message Generation Function (MGF), and AES-Hash is used for the hash function.

Similar to the non-RSA private initialization protocol, the RSA private initialization protocol usually requires only one round-trip between the application program and the backend where the application program acts as a router between the device and the backend. In some cases, an optional round-trip to fetch the backend public key and the current time base from the backend is included along with the round trip to complete the key exchange. The protocol may also be restarted if it was interrupted or if a device is to be reprovisioned at the restart point.

This method is more complex than the pairing-based one, but it is more secure when used on electronic devices with at least some versions of Bluetooth stacks. This method also more easily enables multi-device use. The private initialization protocol may be initiated through a user operation (e.g., button press in the application program), automatically by detecting device proximity (e.g. by embedding a suitable NFC tag in the device), or automatically upon connection/continuation of a wireless connection (e.g., BLE).

Figure 11:
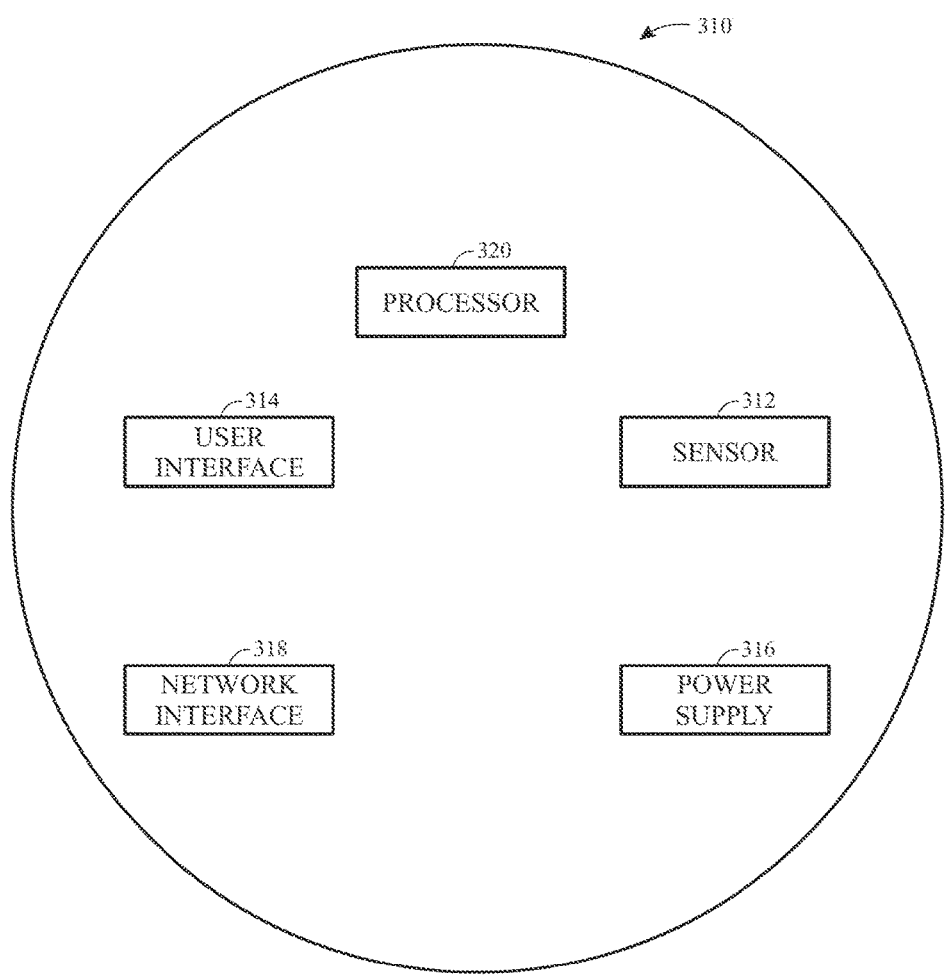
FIG. 11 illustrates an example of a general device that may that may communicate with other like devices using a wireless privatization scheme, according to an embodiment.

FIG. 11 illustrates an example of a general device 310 that may that may communicate with other like devices the wireless scheme 10. In one embodiment, the device 310 may include one or more sensors 312, a user-interface component 314, a power supply 316 (e.g., including a power connection and/or battery), a network interface 318, a processor 320, and the like. Particular sensors 312, user-interface components 314, and power-supply configurations may be the same or similar with each devices 310. However, it should be noted that in some embodiments, each device 310 may include particular sensors 312, user-interface components 314, power-supply configurations, and the like based on a device type or model.

The sensors 312, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 312 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 11 illustrates an embodiment with a single sensor, many embodiments may include multiple sensors. In some instances, the device 10 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more user-interface components 14 in the device 10 may receive input from the user and/or present information to the user. The user-interface component 14 may also include one or more user-input components that may receive information from the user. The received input may be used to determine a setting. In certain embodiments, the user-input components may include a mechanical or virtual component that responds to the user's motion. For example, the user can mechanically move a sliding component (e.g., along a vertical or horizontal track) or rotate a rotatable ring (e.g., along a circular track), the user's motion along a touchpad may be detected, or motions/gestures may be detected using a contactless gesture detection sensor (e.g., infrared sensor or camera). Such motions may correspond to a setting adjustment, which can be determined based on an absolute position of a user-interface component 104 or based on a displacement of a user-interface components 104 (e.g., adjusting a setpoint temperature by 1 degree F. for every 10° rotation of a rotatable-ring component). Physically and virtually movable user-input components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-input component may be associated with a magnitude of a setting adjustment, such that a user may dramatically alter a setting with a large movement or finely tune a setting with s small movement.

The user-interface components 314 may also include one or more buttons (e.g., up and down buttons), a keypad, a number pad, a switch, a microphone, and/or a camera (e.g., to detect gestures). In one embodiment, the user-input component 314 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-input component 314 may include a camera that may detect gestures (e.g., to indicate that a power or alarm state of a device is to be changed). In some instances, the device 310 may have one primary input component, which may be used to set various types of settings. The user-interface components 314 may also be configured to present information to a user via, e.g., a visual display (e.g., a thin-film-transistor display or organic light-emitting-diode display) and/or an audio speaker.

The power-supply component 316 may include a power connection and/or a local battery. For example, the power connection may connect the device 310 to a power source such as a line voltage source. In some instances, an AC power source can be used to repeatedly charge a (e.g., rechargeable) local battery, such that the battery may be used later to supply power to the device 310 when the AC power source is not available. In certain embodiments, the power supply component 316 may include intermittent or reduced power connections that may be less than that provided via an AC plug in the home. In certain embodiments, devices with batteries and/or intermittent or reduced power may be operated as "sleepy devices" that alternate between an online/awake state and an offline/sleep state to reduce power consumption.

The network interface 318 may include one or more components that enable the device 10 to communicate between devices using one or more logical networks within the fabric network. In one embodiment, the network interface 318 may communicate using an efficient network layer as part of its Open Systems Interconnection (OSI) model. In certain embodiments, one component of the network interface 318 may communicate with one logical network (e.g., WiFi) and another component of the network interface may communicate with another logical network (e.g., 802.15.4) and another component of the network interface may communicate using another wireless technology (e.g., BLE). In other words, the network interface 318 may enable the device 310 to wirelessly communicate via multiple IPv4 and/or IPv6 networks. As such, the network interface 318 may include a wireless card, Ethernet port, and/or other suitable transceiver connections.

The processor 320 may support one or more of a variety of different device functionalities. As such, the processor 320 may include one or more processors configured and programmed to carry out and/or cause to be carried out one or more of the functionalities described herein. In one embodiment, the processor 320 may include general-purpose processors carrying out computer code stored in local memory (e.g., flash memory, hard drive, random access memory), special-purpose processors or application-specific integrated circuits, other types of hardware/firmware/software processing platforms, and/or some combination thereof. Further, the processor 320 may be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, the processor 320 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 320 may include image recognition technology to identify particular occupants or objects.

In some instances, the processor 320 may predict desirable settings and/or implement those settings. For example, based on presence detection, the processor 20 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 320 may initiate an audio or visual indicator of where the person, animal or object is or may initiate an alarm or security feature if an unrecognized person is detected under certain conditions (e.g., at night or when lights are off).

Furthermore, all of the foregoing discussion of processes and protocols may be performed by any of the devices discussed herein. Furthermore, each of the devices discussed herein include at least one processor 320 for executing instructions that are stored in memory for the devices. Thus, the processes discussed herein may be stored as instructions that are configured to cause the at least one processor to perform the steps of the processes and protocols discussed herein.

The invention claimed is:

1. An electronic device, comprising:
a wireless network interface;
a processor;
memory comprising instructions executable by the processor to configure the electronic device to:
receive, from a broadcasting device via the wireless network interface, a message with an ephemeral identifier comprising truncated ciphertext, the ephemeral identifier being a temporary identifier that replaces identifiable information about the broadcasting device in the message to conceal which device sent the message with an authorized resolution of the ephemeral identifier;
determine whether the processor can resolve the ephemeral identifier locally to obtain information about the broadcasting device;
if the processor can resolve the ephemeral identifier locally, determine the information about the broadcasting device; and
if the processor cannot resolve the ephemeral identifier, send the message to a remote resolver.

2. The electronic device of claim 1, wherein:
the processor is configured to receive the message from the broadcasting device via the network interface over a Bluetooth Low Energy (BLE) connection; and
the identifiable information comprises a Media Access Control (MAC) address or application-specific identifiers for the broadcasting device.

3. The electronic device of claim 1, wherein the instructions are executable by the processor to configure the electronic device to:
send a list of subscriptions to the remote resolver, wherein the list of subscriptions indicates a type of pertinent broadcasting device or broadcasts that the pertinent broadcasting device may broadcast; and
send a location for the electronic device.

4. The electronic device of claim 3, wherein the instructions are executable by the processor to configure the electronic device to:
receive, from the remote resolver via the wireless network interface, a list of pertinent ephemeral identifiers, wherein each pertinent ephemeral identifier corresponds to a pertinent broadcasting device; and
determine if the received ephemeral identifier matches a pertinent ephemeral identifier of the list of pertinent ephemeral identifiers.

5. The electronic device of claim 4, wherein the instructions are executable by the processor to configure the electronic device to:
if the ephemeral identifier matches the pertinent ephemeral identifier, expand the ephemeral identifier to generate a key;
attempt to decrypt all entries in the list of pertinent ephemeral identifiers to decrypted identifiers; and
determine if the decryption was completed successfully.

6. The electronic device of claim 5, wherein the instructions are executable by the processor to configure the electronic device to:
if the decryption is successfully completed, use the decrypted identifiers to examine information about the broadcasting device or complete an action through the broadcasting device; and
if the decryption is not successfully completed, determine whether the ephemeral identifier matches an alternate list of ephemeral identifiers.

7. The electronic device of claim 6, wherein the instructions are executable by the processor to configure the electronic device to:
if the ephemeral identifier does not match the alternate list of ephemeral identifiers:
indicate that resolution of the ephemeral identifier is indeterminate; and
send the message to the remote resolver to resolve the ephemeral identifier.

8. A method for generating an ephemeral identifier comprising:
generating a ciphertext using a pre-shared key and using time as a variable input to the generating the ciphertext;
truncating the ciphertext to form the ephemeral identifier having a transmission length if the ciphertext is longer than the transmission length, the transmission length being based at least upon security strength and transmission medium;
transmitting the ephemeral identifier;
determining whether a timer has elapsed for generating a new ephemeral identifier; and
if the timer has elapsed, generating the new ephemeral identifier.

9. The method of claim 8, comprising:
determining whether the generating the new ephemeral identifier is to be randomized;
if the generating the new ephemeral identifier is to be randomized, using a randomly chosen value for the timer if a window of generating the new ephemeral identifier is open; and
if the generating the new ephemeral identifier is not to be randomized, using a preset timer as the timer.

10. The method of claim 8, the generating the ciphertext using the pre-shared key and using time as the variable input to the generating the ciphertext including encoding a 4-byte length constant value as a constant value for authenticating a preshared ephemeral identifier key that is generated by a broadcasting device transmitting the ephemeral identifier.

11. The method of claim 8, wherein using a pre-shared key to generate a ciphertext using time as a variable input to the ciphertext generation comprising:
encoding a 4-byte session counter; and
encoding a timestamp as the variable input to the ciphertext.

12. A non-transitory, computer-readable medium comprising instructions executable by a processor to:
receive a message with an ephemeral identifier, which comprises truncated ciphertext, from a remote observer that directly received the message, the ephemeral identifier concealing identifiable information from the remote observer;
receive information about the remote observer from the remote observer;
look up the ephemeral identifier in a lookup table to determine information about the broadcasting device;
send at least a portion of the information about the broadcasting device to the remote observer.

13. The non-transitory, computer-readable medium of claim 12, wherein the information about the remote observer comprises a location of the remote observer, and the instructions are executable by the processor to send the information about the broadcasting device and the location of the remote observer to a remote service to build a database of resolved device locations.

14. The non-transitory, computer-readable medium of claim 12, wherein the instructions are executable by the processor to:
store one or more keys for at least one broadcasting device that includes the broadcasting device;
generate an expected ephemeral identifier for each of the at least one broadcasting device for a period of time.

15. The non-transitory, computer-readable medium of claim 14, wherein the instructions are executable by the processor to populate the lookup table using the generated expected ephemeral identifiers of the at least one broadcasting device and corresponding identifiable information about each of the at least one broadcasting device, wherein the period of time comprises a time range limited by available memory connected to or contained within the non-transitory, computer-readable medium.

16. The non-transitory, computer-readable medium of claim 12, wherein the instructions are executable by the processor to:
receive a subscription list from the remote observer;
receive a location for the remote observer;
generate a list of pertinent broadcasting devices based on location; and
build a list from the generated list using the subscription list.

17. The non-transitory, computer-readable medium of claim 16, wherein the instructions are executable by the processor to compute an ephemeral identifier for an observation period and an observation area for each device in the built list, wherein the observation period indicates how long the remote observer will look for broadcasting devices and the observation area indicates a geographical area where the remote observer is predicted to receive messages from broadcasting devices.

18. The non-transitory, computer-readable medium of claim 17, wherein the instructions are executable by the processor to:
- determine a size of list of ephemeral identifiers and the built list; and
- if the list is too long, reduce the observation period or the observation area.

19. The non-transitory, computer-readable medium of claim 18, wherein the instructions are executable by the processor to:
- build a filter to match the list of ephemeral identifiers;
- expand the ephemeral identifiers in the list of ephemeral identifiers into keys; and
- use the keys to encrypt information about broadcasting devices corresponding to the filtered ephemeral identifiers.

20. The non-transitory, computer-readable medium of claim 19, wherein the instructions are executable by the processor to:
- determine if the filtered list is not a maximum length for a transmission type; and
- if the filtered list is not the maximum length for the transmission type, pad a message sending the list to a maximum size.

* * * * *

UNITED STATES PATENT AND TRADEMARK OFFICE
CERTIFICATE OF CORRECTION

PATENT NO. : 9,801,059 B2
APPLICATION NO. : 14/795772
DATED : October 24, 2017
INVENTOR(S) : Ziv et al.

Page 1 of 1

It is certified that error appears in the above-identified patent and that said Letters Patent is hereby corrected as shown below:

On the Title Page

Item (72) should read:
Alon Ziv, Netanya (IL);
Marcel M. M. Yung, New York, NY (US);
Avinatan Hassidim, Petah (IL);
Yossi Matias, New York, NY (US)

Signed and Sealed this
Fourteenth Day of May, 2019

Andrei Iancu
*Director of the United States Patent and Trademark Office*